United States Patent
Ito et al.

(10) Patent No.: US 8,590,971 B2
(45) Date of Patent: Nov. 26, 2013

(54) SEAT ADJUSTING APPARATUS FOR VEHICLE

(75) Inventors: Sadao Ito, Anjo (JP); Toshiaki Nagata, Kariya (JP); Eiichiro Tsuji, Gifu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 353 days.

(21) Appl. No.: 13/041,712

(22) Filed: Mar. 7, 2011

(65) Prior Publication Data
US 2011/0241400 A1    Oct. 6, 2011

(30) Foreign Application Priority Data
Mar. 31, 2010    (JP) .................................. 2010-080590

(51) Int. Cl.
*B60N 2/16*    (2006.01)
*B60N 2/04*    (2006.01)

(52) U.S. Cl.
USPC ............. 297/344.15; 297/344.17; 297/344.13

(58) Field of Classification Search
USPC ........... 297/344.15, 344.17, 330, 344.13, 325
See application file for complete search history.

(56) References Cited

U.S. PATENT DOCUMENTS

| 6,264,275 B1 * | 7/2001 | Frohnhaus et al. ...... 297/344.12 |
| 6,290,198 B1 * | 9/2001 | Kojima et al. ................ 248/422 |
| 6,572,065 B2 * | 6/2003 | Koga et al. .................... 248/421 |
| 2009/0127907 A1 | 5/2009 | Hoshi et al. |
| 2009/0218868 A1 * | 9/2009 | Koga et al. ................ 297/344.17 |
| 2010/0060061 A1 * | 3/2010 | Koga et al. ................. 297/344.1 |

FOREIGN PATENT DOCUMENTS

| CN | 2064763 U | 10/1990 |
| CN | 2923417 Y | 7/2007 |
| CN | 101277841 A | 10/2008 |
| DE | 200 23 595 U1 | 2/2005 |
| EP | 0 806 319 A1 | 11/1997 |
| EP | 1 905 640 A2 | 4/2008 |
| EP | 1 939 032 A1 | 7/2008 |
| JP | 2006-282019 | 10/2006 |
| JP | 2009-1222 A | 1/2009 |
| JP | 2009-154638 | 7/2009 |
| JP | 2010-51502 A | 3/2010 |

OTHER PUBLICATIONS

Office Action issued Aug. 3, 2012 in Chinese Application No. 201110081947.6 with English language translation.
Extended Search Report issued Jun. 6, 2011 in Europe Application No. 11157256.6.

* cited by examiner

*Primary Examiner* — Milton Nelson, Jr.
(74) *Attorney, Agent, or Firm* — Oblon, Spivak, McClelland, Maier & Neustadt, L.L.P.

(57) ABSTRACT

A seat adjusting apparatus for a vehicle includes a supporting member pivotally supported at a base member by a first bearing, a pinion gear driven by a driving device, a sector gear engageable with the pinion gear and a restriction mechanism formed at the sector gear for restricting a relative rotation between the pinion gear and the sector gear. The restriction mechanism includes a contact portion coming in contact with the pinion gear so that a component force of a reaction force, which works in a direction in which the first bearing is separated from the second bearing, acting on the pinion gear is reduced. A thickness of a first tooth root of a tooth included in the teeth formed at the sector gear is larger than a thickness of a second tooth root of the other teeth formed at the sector gear.

8 Claims, 6 Drawing Sheets

SEAT ADJUSTING APPARATUS FOR VEHICLE

CROSS REFERENCE TO RELATED APPLICATIONS

This application is based on and claims priority under 35 U.S.C. §119 to Japanese Patent Application 2010-080590, filed on Mar. 31, 2010, the entire content of which is incorporated herein by reference.

TECHNICAL FIELD

This disclosure relates to a seat adjusting apparatus for a vehicle, which provides a dimensional adjustment by moving movable portions of the seat for the vehicle.

BACKGROUND DISCUSSION

A seat lifter apparatus is usually provided to a seat for a vehicle in order to adjust a height of the seat according to a physical attribute or preference of a seat occupant. A known seat lifter apparatus disclosed in JP2009-154638A includes a four-bar linkage which is constituted by a base, a front lift link, a lower arm and a rear lift link attached to the lower arm by means of a pin. The rear lift link is formed with a sector gear for engaging with a pinion that is driven and rotated by a motor. The four-bar linkage is driven and operated by the pinion, thereby moving the lower arm upward and downward. The sector gear includes a no-teeth portion, where no teeth are formed, at each circumferential end of the sector gear. The pinion stops rotating when the pinion mounts on the no-teeth portion, which serves as a stopper.

A lifter mechanism disclosed in JP2006-282019A also employs a for-bar linkage. According to the lifter mechanism, a pinion gear and a sector gear both positioned at a front portion drive a rear link via a link rod. Upward and downward movements are stopped by means of a contact between the pinion gear and a no-teeth potion, where no teeth are formed, formed at the sector gear, and by means of a contact between a long hole formed on a seat side frame and a connecting pin fixedly provided at the sector gear.

According to the seat lifter apparatus disclosed in JP2009-154638A, however, when the pinion stops the rotation, a contact portion between each of the no-teeth portions of the sector gear and a tooth of the pinion comes to be under a large load. In this large load, a component force acting in a radial direction of the sector gear (that is, in a direction in which the pinion and the pin are separated from each other) is larger than a component force acting in a circumferential direction of the sector gear. The teeth of the pinion or a bearing portion of a rotation shaft of the pinion may be worn out under a repetitive application of the large load, possibly causing a tooth clatter. In particular, in case that the seat lifter apparatus is operated downward when an occupant is seated on the seat, a weight of the occupant also acts downward in addition to a driving torque of the pinion driven by the motor, which may cause even larger load.

As with the seat lifter apparatus disclosed in JP2009-154638A, according to the lifter mechanism disclosed in JP2006-282019A, a force is applied to a contact portion between the pinion gear and the sector gear in a direction in which an axis of the pinion gear and an axis of the sector gear are separated from each other. In addition, a contact portion between the long hole and the connecting pin comes to be under a reaction force against the contact therebetween. However, it is often difficult to distribute the above-mentioned two forces to above-mentioned two contact portions evenly at the same time, and either one of the two contact portions may receive an excessive force. In case that the excessive force acts to the pinion gear and to the sector gear, a similar phenomenon may occur to that in JP2009-154638A. In case that the excessive force acts to the long hole and to the connecting pin, the long hole or the connecting pin may be deformed.

A need thus exists for a seat adjusting apparatus for a vehicle, which is not susceptible to the drawback mentioned above.

SUMMARY

According to an aspect of this disclosure, a seat adjusting apparatus for a vehicle includes a base member adapted to be provided at a vehicle floor, a supporting member pivotally supported at the base member by means of a first bearing for supporting a load applied to the supporting member, a pinion gear rotatably supported at either one of the base member and the supporting member by means of a second bearing, and driven and rotated by a driving device having a self-locking function, a sector gear integrally provided at the other one of the base member and the supporting member so as to be coaxial with the first bearing and formed with teeth engageable with the pinion gear at an engagement portion, and a restriction mechanism for restricting a relative rotation in at least one direction between the pinion gear and the sector gear. The restriction mechanism is formed at the sector gear and includes a contact portion which comes in contact with the pinion gear in other portion than the engagement portion so that a component force, which works in a direction in which the first bearing is separated away from the second bearing, of a reaction force acting on the pinion gear is reduced. A thickness of a first tooth root of a tooth, which is included in the teeth formed at the sector gear and engages with the pinion gear when the restriction mechanism is in contact with the pinion gear, is larger than a thickness of a second tooth root of the other teeth formed at the sector gear.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
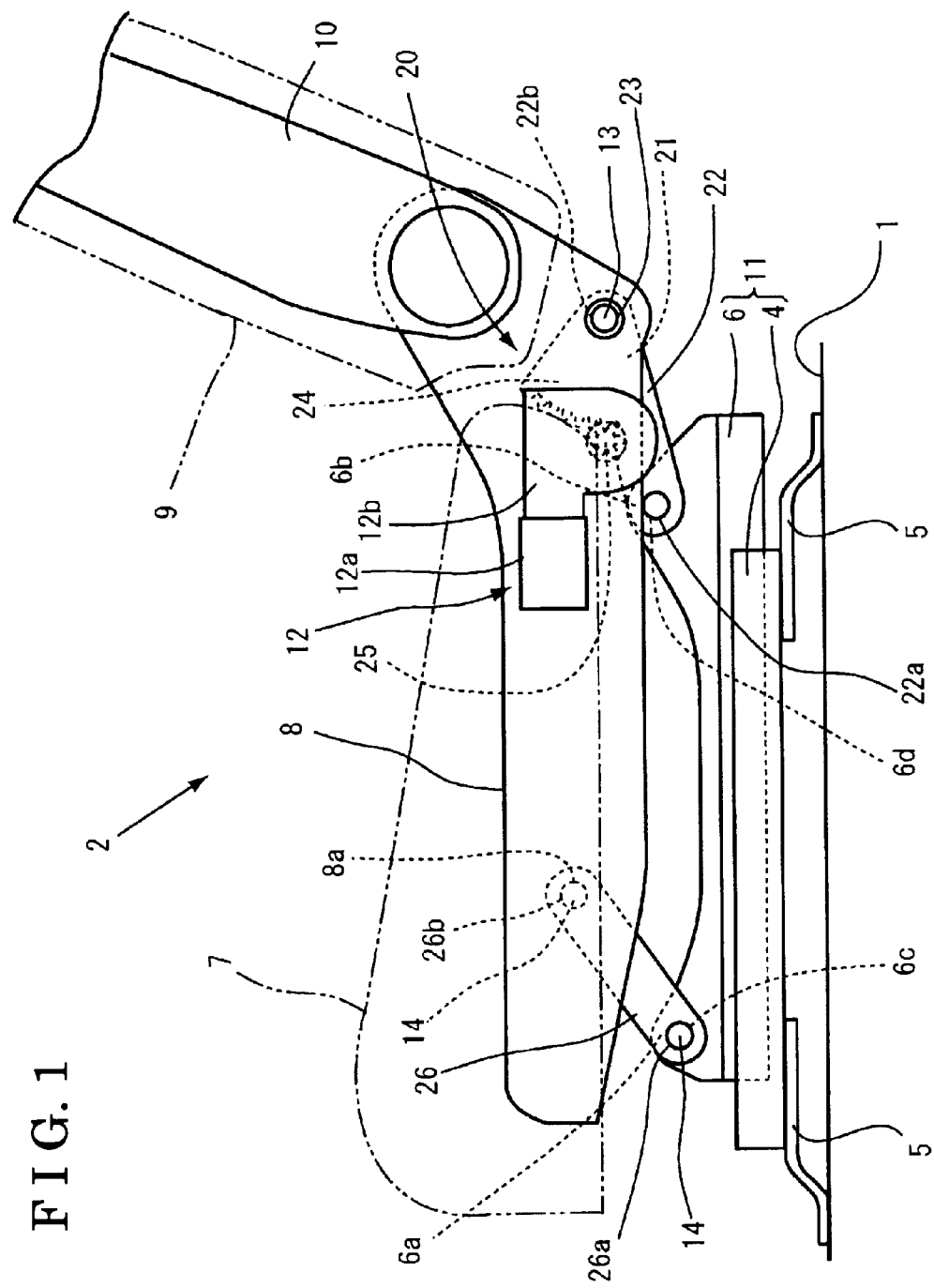
FIG. 1 is a schematic side view of a seat apparatus for a vehicle according to first and second embodiments disclosed here.
Figure 2:
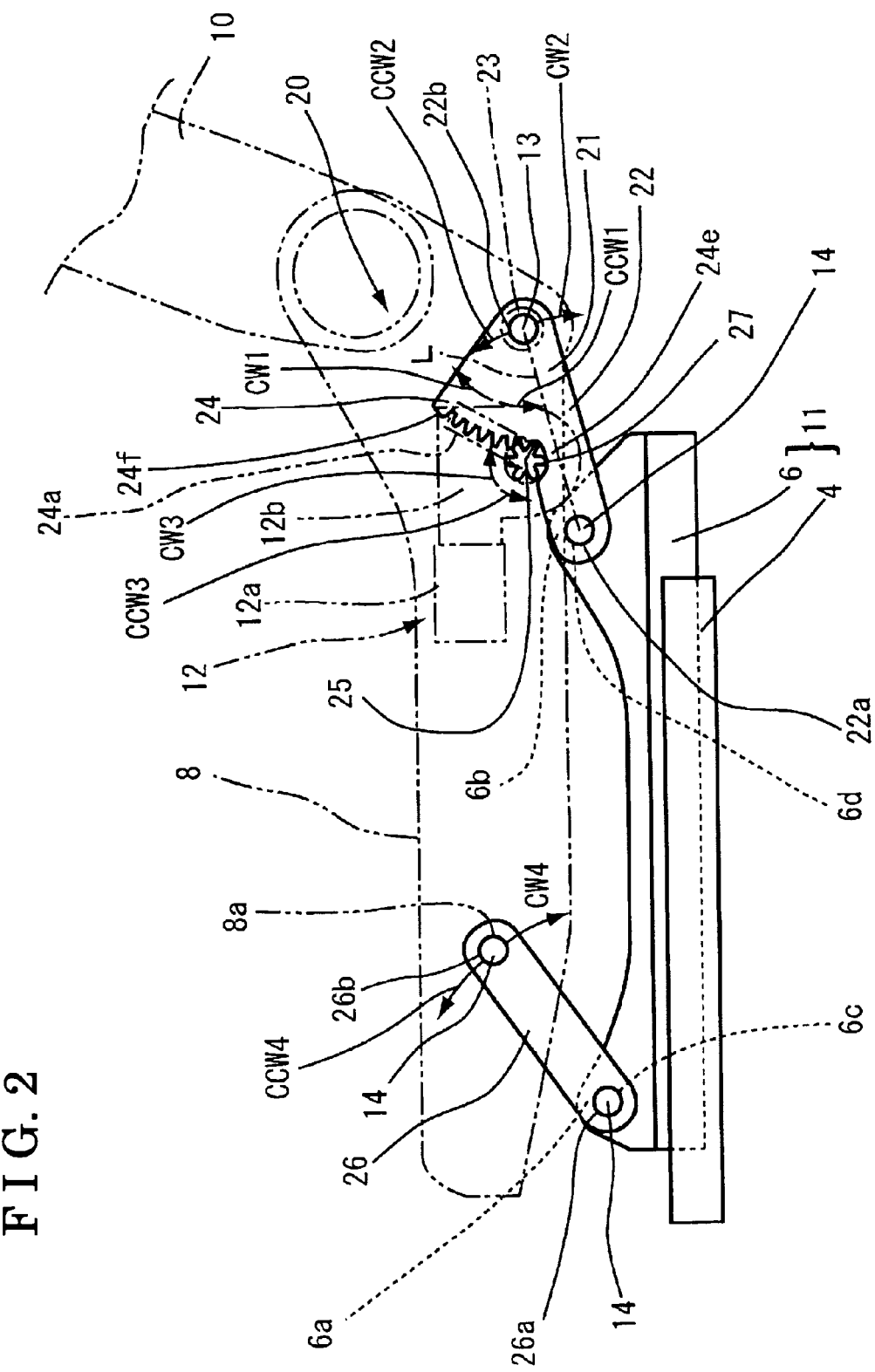
FIG. 2 is a perspective side view of a seat adjusting apparatus for a vehicle according to the first and the second embodiments disclosed here when a seat cushion is stationarily in a lowered position.

A first embodiment of a seat lifter apparatus 20 according to this disclosure will be explained. In FIG. 1, the seat lifter apparatus 20, which serves as a seat adjusting apparatus for a vehicle (hereinafter referred to as the seat adjusting apparatus) for adjusting a height of a seat cushion on which a vehicle occupant is seated, is mounted on a seat apparatus 2 for a vehicle. In FIG. 2, the seat cushion is stationarily in a fully lowered position. As used herein, the terms "a front-rear direction", "a lateral direction" and "a vertical direction (an up-down direction)" and derivatives thereof refer to the directions relative to the vehicle.

As shown in FIG. 1, the seat apparatus 2 for the vehicle (hereinafter referred to as the seat apparatus 2) includes a seat track 11 including a lower rail 4 and an upper rail 6, the seat lifter apparatus 20, a lower arm 8 constituting a seat cushion 7 and a part of the seat lifter apparatus 20, and an upper arm 10 constituting a seatback 9.

According to the seat apparatus 2 of the first embodiment, as shown in FIG. 1, a pair of lower rails 4, 4 is fixedly mounted on a vehicle floor 1 by means of brackets 5, 5 respectively. The pair of lower rails 4, 4 constitutes a pair of seat tracks 11, 11 formed so as to extend in the front-rear direction. The upper rail 6, which allows the seat cushion 7 to move in the front-rear direction relative to the lower rail 4, is slidably mounted on each lower rail 4. In FIG. 1, one of the pair of seat tracks 11, 11 and one of the brackets 5, 5 are shown. The lower rail 4 and the upper rail 6 are structured in a manner that a sliding motion of the upper rail 6 relative to the lower rail 4 is alternately locked and unlocked by means of a locking-and-unlocking mechanism.

As shown in FIGS. 1 and 2, a link attachment portion 6a is integrally formed on an upper front end portion of the upper rail 6, and a link attachment portion 6b is integrally formed on an upper rear end portion of the upper rail 6. The link attachment portions 6a, 6b are formed so that flat portions thereof are parallel to the front-rear direction. The link attachment portion 6a is provided with an attachment hole 6c, and the link attachment portion 6b is provided with an attachment hole 6d. A first link member 21 serving as a link member of the seat lifter apparatus 20 is pivotally connected to the link attachment portion 6b and a second link 26 of the seat lifter apparatus 20 is pivotally connected to the link attachment portion 6a. Thus, the seat lifter apparatus 20 is pivotally connected to the upper rail 6 via the link attachment portions 6a, 6b, the first link member 21 and the second link 26. One end portion of the first link member 21 is pivotally supported by the upper rail 6, and the other end portion of the first link member 21 is pivotally supported by the lower arm 8.

The seat lifter apparatus 20 according to the first and the second embodiments of this disclosure will be explained with reference to FIGS. 1, 2 and 4. The seat lifter apparatus 20 is mounted on either one of the pair of upper rails 6, 6 each arranged on left and right sides of the vehicle. In the embodiments, the seat lifter apparatus 20 is mounted on the upper rail 6 arranged on the left side of the vehicle. The seat lifter apparatus 20 includes a pinion gear 25, the first link member 21 serving as a base member and the lower arm 8 serving as a supporting member. The pinion gear 25 is fixedly mounted on an end portion of a rotation shaft of a motor device 12 serving as a driving device so as to rotate together with the rotation shaft. The lower arm 8 supports a weight (a load) of an occupant seated on the seat cushion 7.

The motor device 12 is positioned outside the lower arm 8, that is, the motor device 12 is oppositely positioned to the lateral center of the seat cushion 7 relative to the lower arm 8. The pinion gear 25, which is fixedly mounted on the rotation shaft of the motor device 12, penetrates the lower arm 8 and protrudes from the lower arm 8 by a predetermined amount toward the lateral center of the seat cushion 7. The first link member 21 is positioned closer to the lateral center of the seat cushion 7 relative to the lower arm 8. The first link member 21 includes a sector gear 24 having teeth, that is, outer teeth which are arranged in an arc shape and is engaged with the pinion gear 25.

Figure 4:
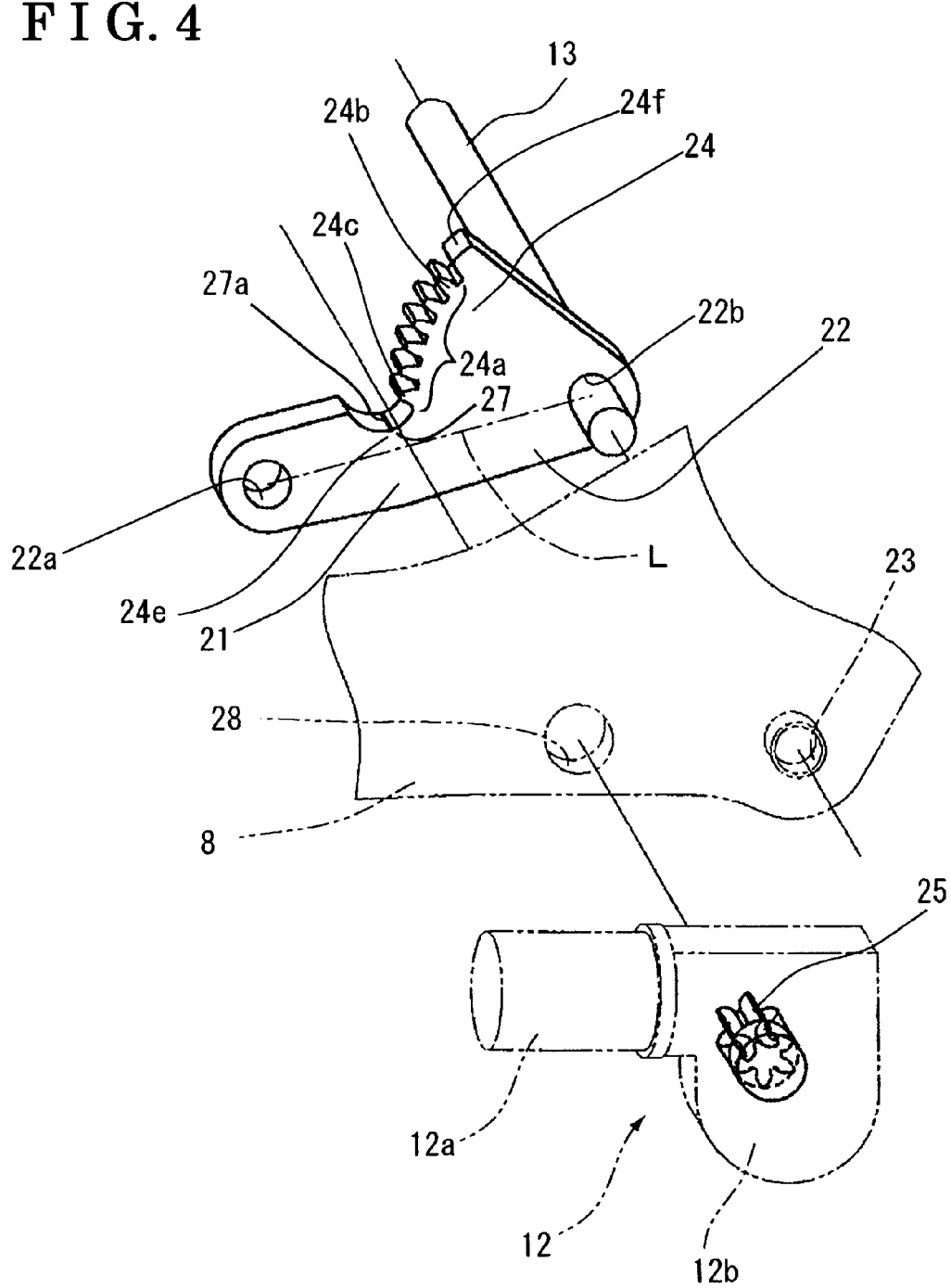
FIG. 4 is an exploded perspective view of the seat adjusting apparatus for the vehicle according to the first embodiment.

As shown in FIGS. 1, 2, and 4, the motor device 12, to which the pinion 25 is connected, includes a motor portion 12a and a reduction unit 12b. A speed of a driving force of the motor portion 12a is reduced by means of a worm gear of the reduction unit 12b and then the driving force is transmitted to the pinion gear 25. The worm gear of the motor device 12 includes a self-locking function restricting an input side of the motor device 12 from being rotated by a rotary force outputted by an output side of the motor device 12. Thus, the pinion gear 25, that is the output side of the motor portion 12a, rotates only when the driving force of the motor portion 12a is supplied to the input side.

The motor device 12 is fixedly attached to an outer flat portion of the lower arm 8 by means of a bolt, that is, the motor device 12 is oppositely positioned to the lateral center of the seat cushion 7 relative to the lower arm 8. The pinion gear 25 of the motor device 12 is rotatably supported by a second bearing 28 formed on the lower arm 8 as shown in FIG. 4.

As shown in FIGS. 2 and 4, the first link member 21 includes a first link portion 22 and the sector gear 24 integrally formed at the first link portion 22. The first link portion 22 is formed into a long shape and a pivot hole 22a is formed on one end portion (hereinafter referred to as a first end portion) of the first link portion 22 relative to a lengthwise direction thereof. The first link portion 22 is pivotally connected to the attachment hole 6d of the upper rail 6 by means of a pivot shaft 14 inserted into the attachment hole 6d of the upper rail 6 so as to be positioned outside the upper rail 6. Thus, the first link member 21 is positioned laterally outside of the upper rail 6. The first link portion 22 includes a securing hole 22b formed on the other end portion (hereinafter referred to as a second end portion) of the first link portion 22 relative to the lengthwise direction. The securing hole 22b is fixedly attached to a drive transmission rod 13 at a vicinity of an end portion of the drive transmission rod 13 so as to rotate together with the drive transmission rod 13. The drive transmission rod 13 is rotatably supported by a first bearing 23 formed at a rear portion of the lower arm 8. Thus, the pair of the lower arms 8, 8 each arranged on left and right sides of the vehicle is connected with each other by means of the drive transmission rod 13. When the seat lifter apparatus 20 (FIGS. 1 and 2) is in the fully lowered position, the first bearing 23 of the lower arm 8 is positioned rearward and slightly upward relative to the pivot hole 22a of the first link portion 22.

As shown in FIGS. 2 and 4, the sector gear 24 includes the outer teeth arranged in the arc shape whose center corresponds to the securing hole 22b of the first link portion 22, that is, corresponds to the first bearing 23 formed on the lower arm 8 so as to be positioned coaxially with the securing hole 22b. In the first embodiment, the outer teeth arranged in the arc shape face a substantially front direction when the seat lifter apparatus 20 (FIG. 1) is in the fully lowered position. The outer teeth of the sector gear 24 engage with the pinion gear 25 at an engagement portion 24a. The engagement portion 24a includes six teeth in the embodiments as shown in FIGS. 2 and 4, however, the number of the teeth may be arbitrary determined.

Among the six teeth of the engagement portion 24a of the sector gear 24, a tooth that is positioned farthest away from a center line L (a line connecting a center of the pivot hole 22a and a center of the securing hole 22b each formed on the first link portion 22) refers to a tooth 24b. A no-teeth portion 24f is formed next to the tooth 24b so as to be positioned away from the center line L. In the no-teeth portion 24f, no engagement occurs between the pinion 25 and the outer teeth of the sector gear 24. The no-teeth portion 24f may be formed into any other shape as long as no engagement occurs between the pinion 25 and the outer teeth of the sector gear 24 when the pinion gear 25 comes to the no-teeth portion 24f, and thus the pinion gear 25 stops rotating. Accordingly, as the pinion gear 25 engages with the engagement portion 24a and rotates or moves relative to the sector gear 24 in a direction away from the center line L, a tooth of the pinion gear 25 eventually reaches the no-teeth portion 24f, and thus the rotation of the pinion gear 25 stops. Thus, a relative rotation between the pinion gear 25 and the sector gear 24, that is, an orbital motion of the pinion gear 25 about the first bearing 23 is restricted and stops. Thus, the no-teeth portion 24f serves as a stopper for stopping the seat cushion 7 from moving upward.

Figure 3:
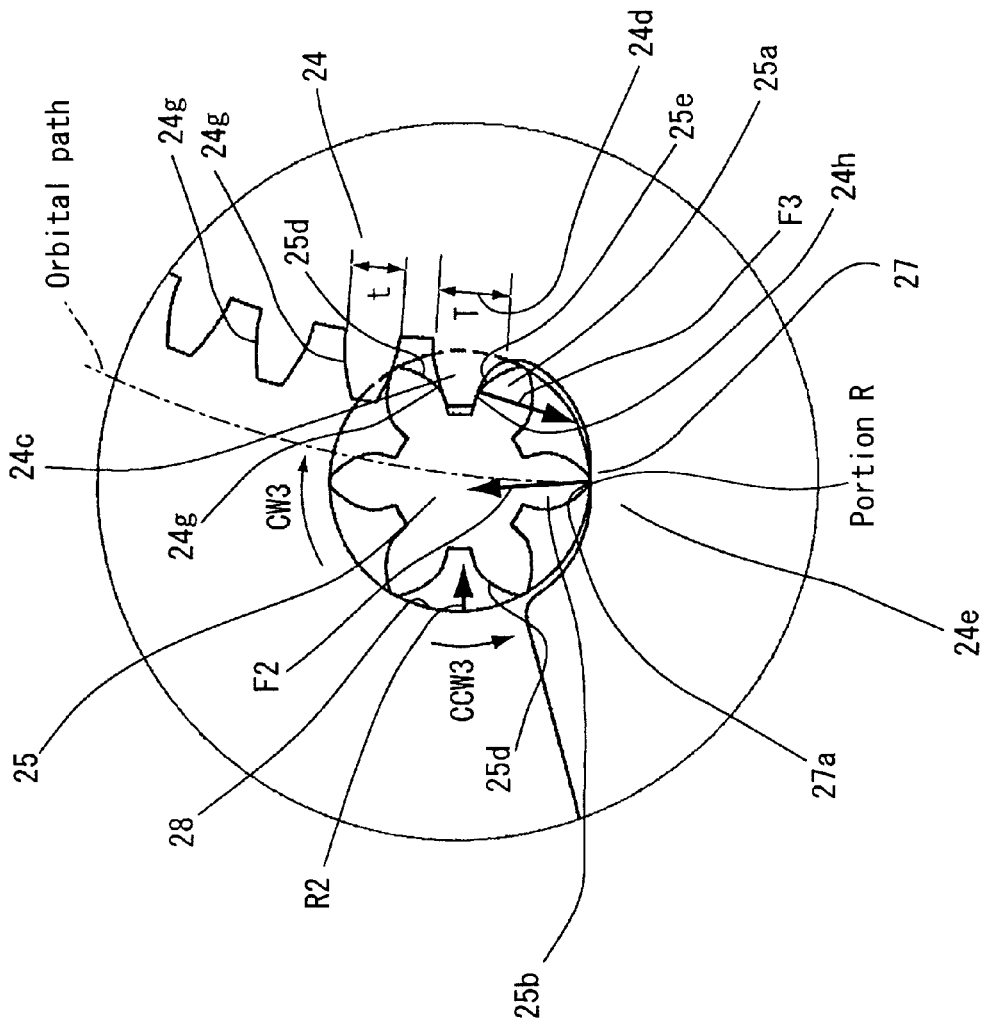
FIG. 3 is an enlarged view of a contact portion formed at a sector gear of the seat adjusting apparatus for the vehicle according to the first embodiment.

As shown in FIGS. 2 and 3, among the six teeth of the engagement portion 24a, a tooth that is positioned closest to the center line L, refers to a tooth 24c. The tooth 24c is formed into a similar shape to that of the other teeth of the engagement portion 24a, however, a thickness T of a first tooth root 24d of the tooth 24c is set to be larger than a thickness t of a second tooth root of the other teeth of the engagement portion 24a. This increases a section modulus of the first tooth root 24d of the tooth 24c, thereby improving a strength of the tooth 24c.

As shown in FIGS. 2 and 3, a base portion 24e is formed next to the tooth 24c of the engagement portion 24a so as to be positioned closer to the center line L relative to the tooth 24c. The base portion 24e includes a contact portion 27 serving as a restriction mechanism restricting the relative rotation between the pinion gear 25 and the sector gear 24 in a direction in which the pinion gear 25 comes closer to the center line L. The contact portion 27 is formed in a vicinity of an intersection of an extended line of an orbital path of a rotation center of the pinion gear 25 and the base portion 24e of the sector gear 24. The orbital path of the rotation center of the pinion gear 25 refers to a trajectory created by the rotation center of the pinion gear 25 when the pinion gear 25 moves relative to the sector gear 24, that is, when the pinion gear 25 orbits about the first bearing 23, while engaging with the engagement portion 24a. After the pinion gear 25 moves relative to the sector gear 24, and when any tooth of the pinion gear 25 comes in contact with the contact portion 27, the pinion gear 25 receives from the contact portion 27 a reaction force F2 working substantially in a direction of a tangent line to the orbital path of the rotation center of the pinion gear 25. Consequently, a component force of the reaction force F2, which works in a direction that the first bearing 23 is separated away from the second bearing 28, is small, that is, reduced.

The contact portion 27 is formed in a manner that a radially outer end of a second tooth 25b serving as a tooth of the pinion gear 25, that is disengaged from the engagement portion 24a, comes in contact with the contact portion 27 when a first tooth 25a of the pinion gear 25 is engaged with the tooth 24c of the engagement portion 24a of the sector gear 24. The contact portion 27 includes a protrusion 27a formed so as to extend in a thickness direction of the sector gear 24. The protrusion 27a includes on the top thereof a portion R. The portion R is formed in a predetermined size so as not to be deformed under an impact force when any tooth of the pinion gear 25 comes in contact with the portion R.

As shown in FIGS. 1 and 2, the lower arm 8 serving as the supporting member is made of a long plate. The lower arm 8 is arranged so as to stand in the vertical direction and so as to extend in the front-end direction. The lower arm 8 supports the weight (the load) of the occupant via a cushion constituting the seat cushion 7. Thus, when the occupant is seated on the seat cushion 7, a force working downward in a direction of gravity is applied to the lower arm 8. The force applied to the lower arm 8 refers to the weight of the occupant, and a sum of a load of the seat cushion 7 and a load of the seatback 9. In other words, the pinion gear 25 of the motor device 12 fixedly attached to the lower arm 8 is also pushed downward in the direction of gravity by the weight of the occupant and other loads. In addition, the securing hole 22b of the first link member 21 is also pushed downward in the direction of gravity by the weight of the occupant and other loads because the first link member 21 is supported by the first bearing 23 of the lower arm 8 via the drive transmission rod 13. Consequently, a rotary force which has a rotation center on the pivot hole 22a and works in a direction CW2 (clockwise direction) is applied to the first link member 21 when the occupant is seated on the seat cushion 7. At this time, the engagement portion 24a of the sector gear 24 is rotated relative to the pinion gear 25 engaged with the engagement portion 24a in the opposite direction to the direction in which the pinion gear 25 is pushed by the loads (downward in a direction of gravity). Because the pinion gear 25 and the motor portion 12a are connected with each other via the worm gear having the self-locking function, the pinion gear 25 does not rotate in any direction unless the motor portion 12a is driven. At this time, the engagement portion 24a, the teeth of the pinion gear 25 engaged with the engagement portion 24a and the worm gear receive the loads. This restricts the seat cushion 7 from falling down while the pinion gear 25 and the engagement portion 24a of the sector gear 24 are engaged with each other.

A pivot hole 8a is formed at a front portion of the lower arm 8. As shown in FIG. 4, the first bearing 23 and the second bearing 28 are formed at the rear portion of the lower arm 8 in a manner that the first bearing 23 is positioned rearward by a predetermined distance relative to the second bearing 28. The pivot hole 8a, the first bearing 23 and the second bearing 28 are through holes. The first bearing 23 is provided with a boss portion formed by a burring process. The boss portion projects so as to assure a contact of the first bearing 23 and the drive transmission rod 13 supported by the first bearing 23, thereby preventing misalignment of a rotational axis of the drive transmission rod 13. Thus, the lower arm 8 is supported, via the drive transmission rod 13 supported by the first bearing 23 formed on the lower arm 8, at the securing hole 22b formed on the sector gear 24.

The second link 26 includes rotation holes 26a, 26b formed on both ends of the second link 26 respectively. The rotation hole 26a is pivotally connected to the attachment hole 6c of the upper rail 6 and the rotation hole 26b is pivotally connected to the pivot hole 8a of the lower arm 8. Thus, a four-bar linkage is established among the lower arm 8, the upper rail 6, the first link portion 22 and the second link 26, and thus the lower arm 8 is pivotally mounted on the upper rail 6. The upper arm 10 constituting the seatback 9 is mounted on an upper rear portion of the lower arm 8 so as to be pivotable relative to the lower arm 8.

Next, an operation of the seat apparatus 2 having the above-described structure will be explained with the reference to FIGS. 2 and 5. First, a relation among forces when the pinion gear 25 and the engagement portion 24a of the sector gear 24 are engaged with each other will be explained. When the pinion gear 25 rotates in a direction CW3 (clockwise direction) and when the pinion gear 25 is engaged with the engagement portion 24a of the sector gear 24, a tooth face 24g of a tooth among the six teeth of the sector gear 24 and a tooth face 25d of a tooth of the pinion gear 25 come in contact and push with each other. Here, the tooth face 24g faces upward and the tooth face 25d refers to the tooth face that faces forward relative to a rotation direction of the pinion gear 25 rotating in the direction CW3 (clockwise direction). In this state, in order to move the seat cushion 7 upward, the motor portion 12a is driven and the driving force of the motor portion 12a is transmitted to the pinion gear 25 via the worm gear serving as the reduction unit 12b. The pinion gear 25 then rotates about a rotation axis thereof in the direction CW3 (clockwise direction) in FIG. 2. The rotation of the pinion gear 25 causes the tooth face 25d to further push the tooth face 24g that is already engaged with the tooth face 25d. Thus, the sector gear 24 starts rotating about the first bearing 23 relative to the pinion gear 25 in a direction CCW1 (counterclockwise direction) in FIG. 2. Thus, the securing hole 22b formed on the first end portion of the first link portion 22, which is formed integrally with the sector gear 24 and works as the first link member 21, rotates about the pivot hole 22a formed on the second end portion of the first link portion 22 in a direction CCW2 (counterclockwise direction) relative to the pinion gear 25. Accordingly, the seat cushion 7 (or the lower arm 8), to which the motor device 12 including the pinion gear 25 is attached, moves upward as the first link member 21 (or the sector gear 24) rotates relative to the pinion gear 25.

At this time, the second link 26 follows an upward movement of the seat cushion 7 (or the lower arm 8) and pivots about the rotation hole 26a in a direction CCW4 (counterclockwise direction) so as to support the front portion of the lower arm 8. A driving torque is transmitted via the drive transmission rod 13, thereby operating the lower arm 8, the first link 22, the second link 26 and the like each mounted on the other one of the pair of the upper rails 6, 6, that is, in the embodiments, the upper rail 6 that is arranged on the right side of the vehicle. And thus the seat cushion 7 (or the lower arm 8) moves upward. The seat lifter apparatus 20 may be mounted on each of the pair of upper rail 6, 6. In this case, two seat lifter apparatuses 20, 20 may be operated synchronously with each other to perform the upward movement.

Figure 5:
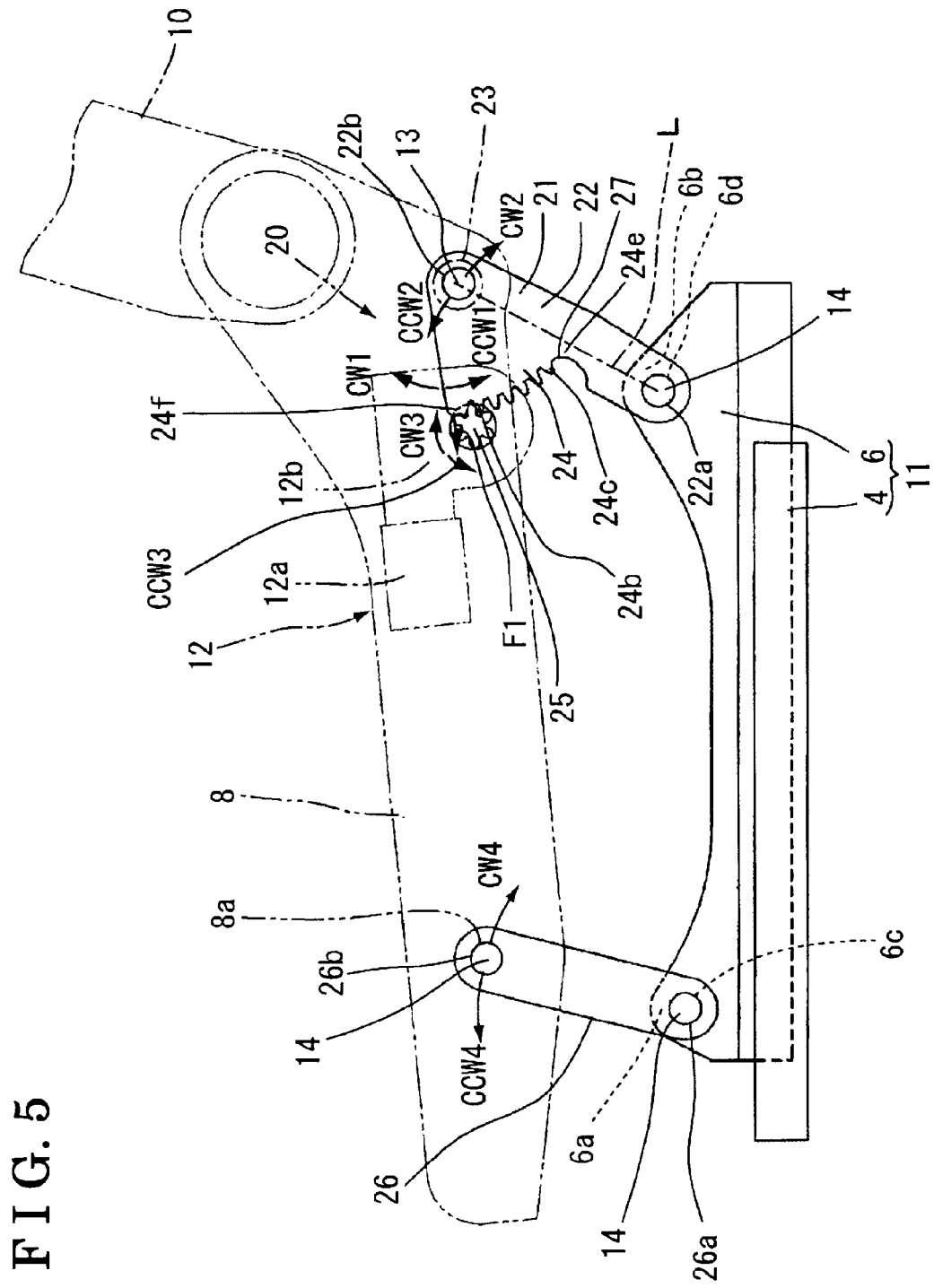
FIG. 5 is a perspective side view of the seat adjusting apparatus for the vehicle according to the first and the second embodiments disclosed here when the seat cushion is stationarily in a raised position.
Figure 6:
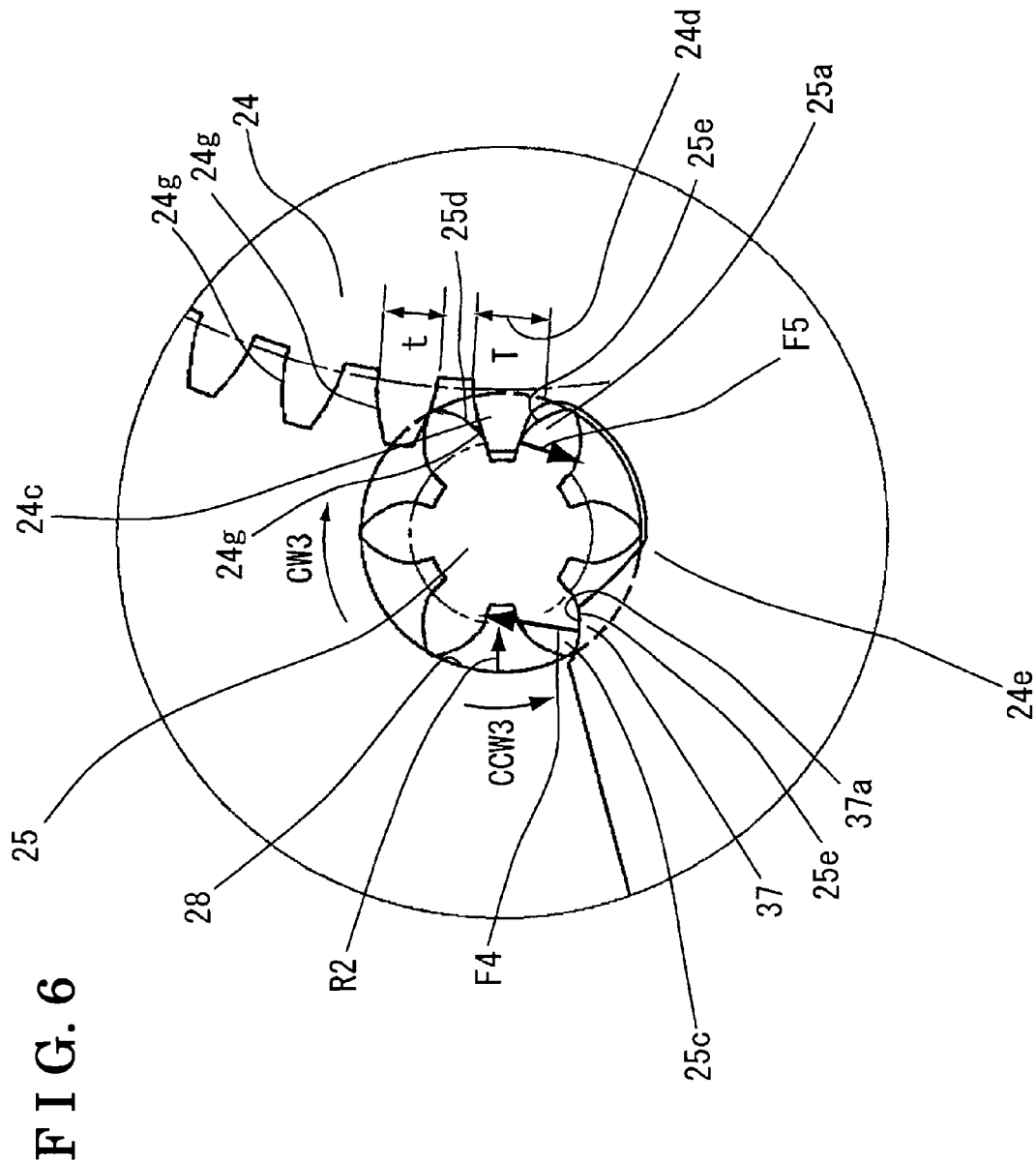
FIG. 6 is an enlarged view of a contact portion formed at the sector gear of the seat adjusting apparatus for the vehicle according to the second embodiment disclosed here.

As shown in FIG. 5, after the pinion gear 25 further rotates in the direction CW3 while engaging with the engagement portion 24a of the sector gear 24, the pinion gear 25 moves relative to the sector gear 24 and passes through the engagement portion 24a, and then the toot of the pinion gear 25 eventually reaches the no-teeth portion 24f. The pinion gear 25, which is driven by the rotary force of the motor portion 12a, stops the rotation relative to the sector gear 24 because the no-teeth portion 24f and the pinion gear 25 are not engageable with each other. Thus, the no-teeth portion 24f serves as the stopper for stopping the seat cushion 7 from moving upward. At this time, the tooth of the pinion gear 25 pushes the no-teeth portion 24f in response to the driving force of the motor portion 12a, thereby generating a reaction force F1 working in a direction in which the first bearing 23 and the second bearing 28 are separated away from each other as shown in FIG. 5. At the same time, a pushing force due to the weight of the occupant seated on the seat cushion 7 and other loads acts on the pinion gear 25 in the downward direction, which is substantially perpendicular to the direction of the reaction force F1. As shown in FIGS. 5 and 6, a force R2 working in the direction in which the first bearing 23 is separated away from the second bearing 28 is generated at the pinion gear 25 due to the reaction force F1 generated at the no-teeth portion 24f by means of the driving force of the motor portion 12a. At this time, however, the pushing force due to the weight of the occupant seated on the seat cushion 7 and other loads acts downward, and the force R2 is not added to the pinion gear 25. Consequently, the reaction force F1 is small in magnitude and thus the first bearing 23 or the second bearing 28 is restricted from being worn out by the reaction force F1. As a result, a gear clatter is restricted.

Next, a movement of the seat lifter apparatus 20 for moving the seat cushion 7 downward will be explained. In order to move the seat cushion 7 downward, the motor portion 12a is driven and the driving force of the motor portion 12a is transmitted to the pinion gear 25 via the worm gear. The pinion gear 25 then rotates about the rotation axis thereof in the direction CCW3 (counterclockwise direction) in FIG. 5. At this time, the force due to the weight of the occupant and other loads is applied to the first link portion 22 formed integrally with the sector gear 24. This force causes the first link portion 22 to rotate about the pivot hole 22a in the direction CW2 (clockwise direction). In this state, as the pinion gear 25 rotates in the direction CCW3 (counterclockwise direction), the tooth face 25d of the pinion gear 25 disengages from the tooth face 24g that is already engaged with and pushing the tooth face 25d. Then, the tooth face 25d comes to engage with the tooth face 24g of the next tooth, that is, the tooth positioned next to the tooth which has come out from the tooth face 25d, that is, the tooth which has left the tooth face 25d. This causes the sector gear 24 to rotate about the first bearing 23 in the direction CW1 (clockwise direction) relative to the pinion gear 25. As a result, the securing hole 22b formed on the first end portion of the first link portion 22, which is formed integrally with the sector gear 24 and works as the first link member 21, rotates about the pivot hole 22a formed on the second end portion of the first link portion 22 in the direction CW2 (clockwise direction). Accordingly, the lower arm 8 (or the seat cushion 7), to which the motor device 12 including the pinion gear 25 is attached, pivotally moves downward as the first link member 21 (or the sector gear 24) and the pinion gear 25 relatively rotate. At this time, the second link 26 follows a downward movement of the lower arm 8 and pivots about the rotation hole 26a in the direction CW4 (clockwise direction) so as to support the front portion of the lower arm 8.

After the pinion gear 25 further rotates in the direction CCW3 (counterclockwise direction), the tooth face 25d of the pinion gear 25 engages with the tooth face 24g of the tooth 24c of the engagement portion 24a of the sector gear 24, and thus the pinion gear 25 further moves relative to the sector gear 24 in a direction in which the pinion gear 25 moves closer to the center line L. Then, the radially outer end of the second tooth 25b positioned next to the first tooth 25a comes in contact with the portion R of the protrusion 27a of the contact portion 27. The second tooth 25b refers to the tooth positioned behind the first tooth 25a, which is one of the teeth of the pinion gear 25 and which is engaging with the tooth 24c of the sector gear 24, by one tooth relative to the rotation direction of the pinion gear 25. Accordingly, the pinion gear 25 stops rotating about the first bearing 23 relative to the sector gear 24 while being engaged with the engagement portion 24a, that is, the pinion gear 25 stops its orbital motion. Thus, the contact portion 27 serves as a stopper for stopping the seat cushion 7 from moving downward. At this time when the pinion gear 25 comes in contact with the protrusion 27a of the contact portion 27, the weight of the occupant seated on the seat cushion 7 and other loads act downward, and thus a large load including the weight of the occupant acts on the contact portion 27. As a result, the reaction force F2 from the contact portion 27, which is large in magnitude, acts on the pinion gear 25.

The reaction force F2 applied from the contact portion 27 to the pinion gear 25 is positioned on the substantial tangent line of the orbital path of the rotation center of the pinion gear 25 because the contact portion 27 is formed in the vicinity of the intersection of the extended line of the path of the rotation center of the pinion gear 25 when the pinion gear 25 orbits about the first bearing 23 and moves relative to the sector gear 24. Thus, the reaction force F2 works in the direction substantially perpendicular to the direction in which the first bearing 23 is separated away from the second bearing 28. Consequently, the first bearing 23 or the second bearing 28 is restricted from being worn out by the reaction force F2 because the reaction force F2 does not work in the direction in which the first bearing 23 is separated away from the second bearing 28. As a result, the gear clatter is restricted.

At this time, a tooth face 25e of the first tooth 25a of the pinion gear 25 is in contact with and pushes the tooth face 24h of the tooth 24c of the sector gear 24 in response to the driving force of the motor portion 12a. This generates a reaction force F3 that works in a substantially opposite direction to a direction in which the pinion gear 25 pushes the tooth 24c of the sector gear 24 while engaging with the sector gear 24 and moving relative to the sector gear 24. The reaction force F2, which the pinion gear 25 receives from the contact portion 27, is cancelled out by the reaction force F3 because the direction of the reaction force F3 is substantially opposite to that of the reaction force F2. Thus, as with the reaction force F1, the reaction force F2 is small, that is, reduced in magnitude and the first bearing 23 or the second bearing 28 is restricted from being worn out by the reaction force F2. The sector gear 24 is made so that the thickness T of the first tooth root 24d of the tooth 24c is larger than the thickness t of the second tooth root of the other teeth of the sector gear 24, and thus a section modulus of the first tooth root 24d is large. Therefore, even though the tooth of the pinion gear 25 repetitively pushes the tooth 24c of the sector gear 24 in one direction and in the other direction when the teeth of the pinion gear 25 are moving relative to the sector gear 24 and when the pinion gear 25 comes to stop, a stress applied to the tooth 24c is alleviated and the tooth 24c is restricted from being damaged.

As explained above, in the first embodiment, the contact portion 27 is formed at the sector gear 24 so that the pinion gear 25 stops moving upon coming in contact with the contact portion 27 relative to the sector gear 24 while engaging with the teeth of the sector gear 24. The contact portion 27 is formed at other portion than the engagement portion 24a engaging with the pinion gear 25 so that the reaction force F2, which acts from the sector gear 24 on the pinion gear 25 when the pinion gear 25 stops, does not work as a large force acting in the direction in which the first bearing 23 is separated away from the second bearing 28. Accordingly, the second bearing 28 supporting the pinion gear 25 is not strongly pushed in the direction in which the second bearing 28 is separated away from the first bearing 23 when the pinion gear 25 stops. As a result, the pinion gear 25, the second bearing 28 or the first bearing 23 is restricted from being worn out.

When the pinion gear 25 comes in contact with the contact portion 27 and stops, the first tooth root 24d of the tooth 24c of the sector gear 24 engaging with the pinion gear 25 receives the rotary force of the pinion gear 25 driven and rotated by the motor device 12. However, the thickness T of the first tooth root 24d of the tooth 24c is set to be larger than the thickness t of the second tooth root of the other teeth of the engagement portion 24a, which increases the section modulus of the first tooth root 24d of the tooth 24c. Therefore, the stress applied to the first tooth root 24d is alleviated even though the tooth 24c receives the pushing force from the pinion gear 25 due to the weight of the occupant supported by the lower arm 8 when the pinion gear 25 rotates while engaging with the sector gear 24. In addition, the stress applied to the first tooth root 24d is also alleviated even though the tooth 24c receives from the pinion gear 25 a pushing force that acts in a substantially opposite direction to a direction in which the above-mentioned pushing force and that is generated by the rotation of the pinion gear 25 when the pinion gear 25 comes in contact with the contact portion 27 and stops. Thus, durability and reliability of the sector gear 24 is improved even though the above-described pushing forces are applied alternatively and repetitively. Further, when the pinion gear 25 comes in contact with the contact portion 27 and stops, the pinion gear 25 receives the reaction force F2 from the teeth of the sector gear 24. A direction of the reaction force F3 is substantially opposite to the direction in which the reaction force F2 acting on the pinion gear 25 at the contact portion 27. Therefore, the reaction force F2 at the contact portion 27 is cancelled out, which restricts the second bearing 28 supporting the pinion gear 25 from being strongly pushed in the direction in which the second bearing 28 is separated away from the second bearing 23 when the pinion gear 25 stops. As a result, the pinion gear 25, the second bearing 28 or the first bearing 23 is restricted from being worn out.

According to the first embodiment, in order to stop the pinion gear 25, the contact portion 27 is formed in a vicinity of the extended line of the orbital path of the rotation center of the pinion gear 25 when the pinion gear 25 moves relative to the sector gear 24, that is, when the pinion gear 25 orbits about the first bearing 23. Accordingly, the direction of the reaction force F2 that the pinion gear 25 receives from the sector gear 24 at the contact portion 27 refers to the direction of the tangent line to the orbital path of the rotation center of the pinion gear 25. In other words, the direction of the reaction force F2 is substantially perpendicular to the direction in which the first bearing 23 is separated away from the second bearing 28. Consequently, no large pushing force in the direction in which the second bearing 28 and the first bearing 23 are separated away from each other acts on the second bearing 28, and thus the pinion gear 25, the second bearing 28 or the first bearing 23 is restricted from being worn out.

According to the first embodiment, the sector gear 24 is provided with the contact portion 27 serving as the restriction mechanism for restricting the relative rotation between the pinion gear 25 and the sector gear 24 in a direction in which the pinion gear 25 and the sector gear 24 rotate relative to each other due to the load supported by the lower arm 8. In case that the direction in which the pinion gear 25 is pushed by the load and the direction in which the sector gear 24 moves relative to the pinion gear 25 when the sector gear 24 is pushed by the load supported by the lower arm 8 are relatively opposite to each other, when the pinion gear 25 comes in contact with the sector gear 24 and stops, the impact force is applied to the sector 24. The impact force includes the rotary force of the pinion gear 25 and the load supported by the lower arm 8, and is large in magnitude. However, the contact portion 27 receives the impact force securely, thereby improving the reliability of the sector gear 24.

Next, a second embodiment of the seat lifter apparatus 20 according to this disclosure will be explained. The first and the second embodiments are identical except for a shape of the contact portion, therefore, only the difference will be explained hereunder and the explanation on the identical structures or portions will be omitted. In the second embodiment, the identical numerical designations are given to the parts, the portions and the like having identical functions to those of the first embodiment.

As shown in FIG. 6, according to the second embodiment, a contact portion 37 is formed by adding a material to the base portion 24e of the sector gear 24 so as to come in contact with the tooth of the pinion gear 25. Here, the contact portion 37 is positioned substantially opposite to the engagement portion 24a where the pinion gear 25 and the sector gear 24 engage with each other and to the first bearing 23 with respect to a center of the second bearing 28 (refer to FIGS. 1 and 2).

The contact portion 37 is formed into a shape that matches a shape of the tooth face 25e of a tooth 25c positioned behind the first tooth 25a by two teeth relative to the rotation direction of the pinion gear 25 when the pinion gear 25 rotates about the rotation axis thereof in a direction CCW3 (counterclockwise direction) in FIG. 6 and when the first tooth 25a of the pinion gear 25 engages with the tooth 24c of the sector gear 24 so that the contact portion 37 comes in contact with the tooth face 25e of the tooth 25c. The tooth face 25e refers to a tooth face facing forward relative to the rotation direction of the pinion gear 25 rotating in the direction CCW3 (counterclockwise direction).

Next, a movement of the seat lifter apparatus 20 for moving the seat cushion 7 downward will be explained. The movement is identical to that explained in the first embodiment except for the movement when the pinion gear 25 comes in contact with the contact portion, therefore, the explanation will start at a point immediately before the pinion gear 25 comes in contact with the contact portion 37.

As shown in FIG. 6, when the pinion gear 25 rotates in the direction CCW3 (counterclockwise direction), the tooth face 25d of the pinion gear 25 engages with the tooth face 24g of the tooth 24c of the engagement portion 24a of the sector gear 24, and thus the pinion gear 25 moves relative to the sector gear 24 in the direction in which the pinion gear 25 moves closer to the center line L shown in FIG. 2. Then, the tooth face 25e of the tooth 25c of the pinion gear 25 comes in contact with a contact surface 37a of the contact portion 37. Accordingly, the pinion gear 25 stops rotating about the first bearing 23 relative to the sector gear 24 while being engaged with the engagement portion 24a. Thus, the contact portion 37 serves as the stopper for stopping the seat cushion 7 from moving downward. At this time when the pinion gear 25 comes in contact with the contact surface 37a of the contact portion 37, the weight of the occupant seated on the seat cushion 7 and other loads act downward, and thus the large load including the weight of the occupant acts on the contact surface 37a of the contact portion 37. As a result, a reaction force F4 from the contact surface 37a acts on the pinion gear 25 as shown FIG. 6. The reaction force F4 includes a function for receiving the rotary force of the pinion gear 25, which will be explained later. Accordingly, a magnitude of the reaction force F4 corresponds to a magnitude of a resultant force of a force for stopping the orbital motion of the pinion gear 25 and a force receiving the rotary force of the pinion gear 25. The direction of the reaction force F4 is substantially perpendicular to, or alternatively, is opposite to the direction in which the second bearing 28 is separated away from the first bearing 23. That is, the reaction force F4 includes a component force whose direction is substantially perpendicular to, or alternatively, is opposite to the direction in which the second bearing 28 is separated away from the first bearing 23.

At this time, the tooth 24c of the sector gear 24, which is in contact with the first tooth 25a of the pinion gear 25, receives the rotary force of the pinion gear 25 in response to the driving force of the motor portion 12a. This generates a reaction force F5 as shown in FIG. 6. A magnitude of the reaction force F5 is small because substantially a half of the reaction force F5 is borne at the contact portion 37 as explained above. In addition, the reaction force F5 works in a substantially opposite direction to the direction in which the reaction force F4, which is applied from the contact portion 37 of the sector gear 24 to the pinion gear 25, works. Thus, a component force of the reaction force F5, in the direction in which the second bearing 28 supporting the pinion gear 25 is separated away from the first bearing 23, is small. Alternatively a direction of the component force of the reaction force F5 is opposite to the direction in which the second bearing 28 is separated away from the first bearing 23. In addition, the two reaction forces F4 and F5 are cancelled out by each other by a certain magnitude. As a result, no large pushing force acts on the pinion gear 25, the second bearing 28 or the first bearing 23, and thus the pinion gear 25, the first bearing 23 or the second bearing 28 is restricted from being worn out.

In addition, the sector gear 24, which causes the reaction force F5 to occur, is made so that the thickness T of the first tooth root 24d of the tooth 24c is larger than the thickness t of the second tooth root of the other teeth of the sector gear 24, and thus the section modulus of the first tooth root 24d is large. Therefore, even though the tooth of the pinion gear 25 repetitively pushes the tooth 24c of the sector gear 24 in one direction and in the other direction when the teeth of the pinion gear 25 are moving relative to the sector gear 24 and when the pinion gear 25 comes to stop, the stress applied to the first tooth root 24d of the tooth 24c is alleviated and the tooth 24c is restricted from being damaged. Consequently, in the second embodiment, a similar effect to that of the first embodiment is expected.

As is clear from the explanation above, according to the second embodiment, the contact portion 37, in which the tooth of the pinion gear 25 comes in contract with the sector gear 24, is formed to be positioned substantially opposite to the engagement portion 24a where the pinion gear 25 and the sector gear 24 engage with each other and to the first bearing 23 with respect to the center of the second bearing 28. Thus, the magnitude of the reaction force F4, which the pinion gear 25 in the contact portion 37 receives from the sector gear 24, includes a magnitude of the reaction force generated for stopping the orbital motion of the pinion gear 25, and a magnitude of the reaction force having a substantially same magnitude but working in a substantially opposite direction relative to the reaction force that the pinion gear 25 receives from the engagement portion 24a due to the rotary force of the pinion gear 25. Thus, the reaction force F5 that the pinion gear 25 receives from the tooth 24c of the engagement portion 24a is cancelled out by the reaction force F4 generated at the contact portion 37. Consequently, only the reaction force F4 generated for stopping the orbital motion of the pinion gear 25 acts to the contact portion 37. The reaction force F4 works in the direction substantially perpendicular to the direction in which the second bearing 28 supporting the pinion gear 25 is separated away from the first bearing 23. As a result, the pinion gear 25, the second bearing 28 or the first bearing 23 is restricted from being worn out.

In the first and the second embodiments, the contact portion 27, 37 corresponding to the restriction mechanism is provided only at an opposite side of the no-teeth portion 24f relative to the engagement portion 24a, so that the contact portion 27, 37 serves as the stopper when the seat cushion 7 is moved downward. However, the contact portion 27, 37 according to the first and the second embodiments may be provided to be positioned outside the tooth 24b of the sector gear 24, that is, as a replacement for the no-teeth portion 24f.

In the first and the second embodiments, the seat adjusting apparatus 20 according to this disclosure is used in an apparatus for adjusting the height of the seat cushion 7 of the seat for the vehicle. However, the seat adjusting apparatus 20 according to this disclosure may be used in a tilt apparatus for adjusting an angle of a seating surface of the seat cushion by means of an engagement between the pinion gear 25 and the sector gear 24. The seat adjusting apparatus 20 according to this disclosure may also be used in an angle adjusting apparatus for adjusting an angle of a seatback relative to the seat cushion of the seat for the vehicle by means of the engagement between the pinion gear 25 and the sector gear 24.

In the first and the second embodiments, the first link portion 22 and the sector gear 24 are integrally formed. The sector gear 24 engages with the pinion gear 25 mounted on the motor device 12 that is attached to the lower arm 8, thereby causing the seat cushion 7 to move upward and downward. However, the sector gear 24 may be provided at the lower arm 8 and the motor device 12 including the pinion gear 25 may be fixedly attached to the first link portion 22, so that the pinion gear 25 and the sector gear 24 engage with each other, and thus the seat cushion 7 is moved upward and downward. The contact portion 27, 37 serving as the restriction mechanism may be provided at the sector gear 24 in this case, which will have the similar effects to those according to the first and the second embodiments.

The seat adjusting apparatus 20 according to the first and the second embodiments may be used in an adjusting apparatus adjusting the height or the angle by means of the engagement between the pinion gear 25 and the sector gear 24, which is manually operated instead of driven by the motor device 12. In this case, the driving force of the motor does not work, therefore, an impact due to the weight of the occupant is alleviated and thus the durability improves accordingly.

According to the first and the second embodiments, the seat adjusting apparatus 20 for the vehicle includes the first link member 21 adapted to be provided at the vehicle floor 1, the lower arm 8 pivotally supported at the first link member 21 by means of the first bearing 23 for supporting the load applied to the lower arm 8, the pinion gear 25 rotatably supported at either one of the first link member 21 and the lower arm 8 by means of the second bearing 28, and driven and rotated by the motor device 12 having the self-locking function, the sector gear 24 integrally provided at the other one of the first link member 21 and the lower arm 8 so as to be coaxial with the first bearing 23 and formed with teeth engageable with the pinion gear 25 at the engagement portion 24a, and the contact portion 27, 37 for restricting the relative rotation in at least one direction between the pinion gear 25 and the sector gear 24. The contact portion 27, 37 is formed at the sector gear 24 and comes in contact with the pinion gear 25 in other portion than the engagement portion 24a so that the component force, which works in the direction in which the first bearing 23 is separated away from the second bearing 28, of the reaction force F2, F4 acting on the pinion gear 25 is reduced. The thickness T of the first tooth root 24d of the tooth 24c, which is included in the teeth formed at the sector gear 24 and engages with the pinion gear 25 when the contact portion 27, 37 is in contact with the pinion gear 25, is larger than the thickness t of the second tooth root of the other teeth formed at the sector gear 24.

Consequently, the contact portion 27, 37 is formed at the sector gear 24 so that the pinion gear 25 stops moving upon coming in contact with the contact portion 27, 37 relative to the sector gear 24 while engaging with the teeth of the sector gear 24. The contact portion 27, 37 is formed at other portion than the engagement portion 24a engaging with the pinion gear 25 so that the reaction force F2, which acts from the sector gear 24 on the pinion gear 25 when the pinion gear 25 stops, does not work as a large force acting in the direction in which the first bearing 23 is separated away from the second bearing 28. Accordingly, the second bearing 28 supporting the pinion gear 25 is not strongly pushed in the direction in which the second bearing 28 is separated away from the first bearing 23 when the pinion gear 25 stops. As a result, the pinion gear 25, the second bearing 28 or the first bearing 23 is restricted from being worn out.

In addition, when the pinion gear 25 comes in contact with the contact portion 27, 37 and stops, the first tooth root 24d of the tooth 24c of the sector gear 24 engaging with the pinion gear 25 receives the rotary force of the pinion gear 25 driven and rotated by the motor device 12. However, the thickness T of the first tooth root 24d of the tooth 24c is set to be larger than the thickness t of the second tooth root of the other teeth of the engagement portion 24a, which increases the section modulus of the first tooth root 24d of the tooth 24c. Therefore, the stress applied to the first tooth root 24d is alleviated even though the tooth 24c receives the pushing force from the pinion gear 25 due to the load supported by the lower arm 8 while the pinion gear 25 is rotating. In addition, the stress applied to the first tooth root 24d is also alleviated even though the tooth 24c receives from the pinion gear 25 a pushing force that acts in a substantially opposite direction to a direction in which the above-mentioned pushing force and that is generated by the rotation of the pinion gear 25 when the pinion gear 25 comes in contact with the contact portion 27 and stops. Thus, the reliability of the sector gear 24 is improved even though the above-described pushing forces are applied alternatively and repetitively. Further, when the pinion gear 25 comes in contact with the contact portion 27, 37 and stops, the pinion gear 25 receives the reaction force F2, F4 from the teeth of the sector gear 24. A direction of the reaction force F3, F5 is substantially opposite to the direction in which the reaction force F2, F4 acting on the pinion gear 25 at the contact portion 27, 37. Therefore, the reaction force F2, F4 at the contact portion 27, 37 is cancelled out, which prevents the second bearing 28 supporting the pinion gear 25 from being strongly pushed in the direction in which the second bearing 28 is separated away from the second bearing 23 when the pinion gear 25 stops. As a result, the pinion gear 25, the second bearing 28 or the first bearing 23 is restricted from being worn out.

According to the first and the second embodiments, the contact portion 27, 37 comes in contact with the pinion gear 25 in a vicinity of the orbital path of the rotation center of the pinion gear 25 when the pinion gear 25 orbits about the sector gear 24.

In order to stop the pinion gear 25, the contact portion 27 is formed in a vicinity of the extended line of the orbital path of the rotation center of the pinion gear 25 when the pinion gear 25 moves relative to the sector gear 24, that is, when the pinion gear 25 orbits about the first bearing 23. Accordingly, the direction of the reaction force F2 that the pinion gear 25 receives from the sector gear 24 at the contact portion 27, 37 refers to the direction of the tangent line to the orbital path of the rotation center of the pinion gear 25. In other words, the direction of the reaction force F2 is substantially perpendicular to the direction in which the first bearing 23 is separated away from the second bearing 28. Consequently, no large pushing force in the direction in which the second bearing 28 and the first bearing 23 are separated away from each other acts on the second bearing 28, and thus the pinion gear 25, the second bearing 28 or the first bearing 23 is restricted from being worn out.

According to the first embodiment, the contact portion 37 comes in contact with the pinion gear 25 at the opposite side, with respect to the center of the second bearing 28, to the side at which the engagement portion 24a and the first bearing 23 are positioned.

Consequently, the contact portion 37, in which the tooth of the pinion gear 25 comes in contract with the sector gear 24, is formed to be positioned substantially opposite to the engagement portion 24a where the pinion gear 25 and the sector gear 24 engage with each other and to the first bearing 23 with respect to the center of the second bearing 28. Thus, the magnitude of the reaction force F4, which the pinion gear 25 in the contact portion 37 receives from the sector gear 24, includes a magnitude of the reaction force generated for stopping the orbital motion of the pinion gear 25, and a magnitude of the reaction force having a substantially same magnitude but working in a substantially opposite direction relative to the reaction force that the pinion gear 25 receives from the engagement portion 24a. Thus, the reaction force F5 that the pinion gear 25 receives from the tooth 24c of the engagement portion 24a is cancelled out by the reaction force F4 generated at the contact portion 37. Consequently, only the reaction force F4 generated for stopping the orbital motion of the pinion gear 25 acts to the contact portion 37. The reaction force F4 works in the direction substantially perpendicular to the direction in which the second bearing 28 supporting the pinion gear 25 is separated away from the first bearing 23. As a result, the pinion gear 25, the second bearing 28 or the first bearing 23 is restricted from being worn out.

According to the first and the second embodiments, the contact portion 27, 37 restricts the relative rotation between the pinion gear 25 and the sector gear 24 in the direction in which the relative rotation is caused by the load applied to the lower arm 8.

Consequently, the sector gear 24 is provided with the contact portion 27, 37 serving as the restriction mechanism for restricting the relative rotation between the pinion gear 25 and the sector gear 24 in the direction in which the pinion gear 25 and the sector gear 24 rotate relative to each other due to the load supported by the lower arm 8. In case that the direction in which the pinion gear 25 is pushed by the load and the direction in which the sector gear 24 moves relative to the pinion gear 25 when the sector gear 24 is pushed by the load supported by the lower arm 8 are relatively opposite to each other, when the pinion gear 25 comes in contact with the sector gear 24 and stops, the impact force is applied to the sector 24. The impact force includes the rotary force of the pinion gear 25 and the load supported by the lower arm 8, and is large in magnitude. However, the contact portion 27 receives the impact force securely, thereby improving the reliability of the sector gear 24.

According to the first and the second embodiments, the base member 21 refers to the first link member 21. One end portion of the first link member 21 is pivotally supported by the upper rail 6 of the seat track 11 adapted to be mounted on the vehicle floor 1 for adjusting, in the front-rear direction of the vehicle, the seat cushion 7 on which the occupant is seated, and the other end portion of the first link member 21 is pivotally supported by the lower arm 8 constituting the seat cushion 7. The supporting member 8 refers to the lower arm 8. The pinion gear 25 is rotatably supported by the second bearing 28 formed on the lower arm 8.

The base member 21 refers to the first link member 21 whose end portions are pivotally supported by the upper rail 6 of the seat track 11 adapted to be mounted on the vehicle floor 1 and by the lower arm 8 constituting the seat cushion 7 that supports the weight of the occupant, respectively. The supporting member 8 refers to the lower arm 8. The pinion gear 25 is rotatably supported by the second bearing 28 formed on the lower arm 8. The sector gear 24 is integrally provided at the first link member 21 so as to be coaxial with the first bearing 23. Thus, the seat adjusting apparatus 20 for the vehicle according to the embodiments is used for moving the seat cushion 7 upward and downward, which the occupant is seated on and the large load is applied to. Due to the above described structure, when the seat cushion 7 is moved downward and then stopped, the tooth of the pinion gear 25 comes in contact with the contact portion 27, 37 and receives the load securely. At this time, the direction of the reaction force F2, F4 generated at the contact portion 27, 37 and acting on the pinion gear 25, and the direction of the reaction force F3, F5 generated at the engagement portion 24a, which receives the rotary force of the pinion gear 25, and acting on the pinion gear 25 are substantially opposite to each other. Consequently, the two reaction forces F2, F4 and F3, F5 are cancelled out by each other by a certain magnitude. A remaining reaction force after the cancellation works in the direction substantially perpendicular to the direction in which the first bearing 23 is separated away from the second bearing 28. Consequently, the component force of the reaction force F2, F3, F4, F5, which works in the direction that the first bearing 23 is separated away from the second bearing 28, is small, that is, reduced. As a result, the seat adjusting apparatus 20 for the vehicle, where the pinion gear 25, the second bearing 28 or the first bearing 23 is restricted from being worn out, is provided.

According to the first and the second embodiments, the first link member 21 is provided with the pivot hole 22a formed on the first end portion of the first link member 21 and the securing hole 22b formed on the second end portion of the first link member 21 for supporting the first bearing 23. The first link member 21 includes the first link portion 22 formed into the long shape and is pivotally connected to the attachment hole 6d of the upper rail 6 by means of the pivot shaft 14 so as to be positioned outside of the upper rail 6 and the sector gear 24 integrally formed at the first link portion 22.

Consequently, the seat adjusting apparatus 20 for the vehicle, which is small in size and which includes less number of parts, is provided.

According to the first and the second embodiments, the no-teeth portion 24f for restricting the engagement with the pinion gear 25 is formed at the sector gear 24 so as to be positioned next to the tooth 24b and so as to be positioned away from the center line L. The center line L connects the center of the pivot hole 22a formed on the first link portion 22 and the center of the securing hole 22b formed on the first link portion 22. The tooth 24b is included in the teeth of the sector gear 24 and is positioned farthest away from the center line L.

Consequently, the rotation of the pinion gear 25 stops when the tooth of the pinion gear 25 reaches the no-teeth portion 24f. This stops the relative rotation between the pinion gear 25 and the sector gear 24. Thus, the no-teeth portion 24f serves as the stopper for stopping the lower arm 8 from moving upward.

According to the first embodiment, the contact portion 27 includes the protrusion 27a coming in contact with the radially outer end of the second tooth 25b of the pinion gear 25 under a condition that the pinion gear 25 engages with the engagement portion 24a of the sector gear 24. The second tooth 25b of the pinion gear 25 is disengaged from the engagement portion 24a of the sector gear 24.

Consequently, the pinion gear 25 stops moving relative to the sector gear 24 while being engaged with the engagement portion 24a of the sector gear 24, that is, the pinion gear 25 stops its orbital motion. Thus, the contact portion 27 serves as the stopper for stopping the lower arm 8 from moving downward.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat adjusting apparatus for a vehicle, comprising:
    a base member adapted to be provided at a vehicle floor;
    a supporting member pivotally supported at the base member by means of a first bearing for supporting a load applied to the supporting member;
    a pinion gear rotatably supported at either one of the base member and the supporting member by means of a second bearing, and driven and rotated by a driving device having a self-locking function;
    a sector gear integrally provided at the other one of the base member and the supporting member so as to be coaxial with the first bearing, the sector gear being formed with teeth engageable with the pinion gear at an engagement portion; and
    a restriction mechanism for restricting a relative rotation in at least one direction between the pinion gear and the sector gear, wherein
        the restriction mechanism is formed at the sector gear and includes a contact portion, the contact portion coming in contact with the pinion gear in a portion other than the engagement portion so that a component force of a reaction force acting on the pinion gear is reduced, the component force working in a direction in which the first bearing is separated away from the second bearing, and
        a thickness of a first tooth root of a tooth included in the teeth formed at the sector gear is larger than a thickness of a second tooth root of the other teeth formed at the sector gear, the tooth engaging with the pinion gear when the contact portion is in contact with the pinion gear.

2. The seat adjusting apparatus for the vehicle according to claim 1, wherein the contact portion comes in contact with the pinion gear in a vicinity of an orbital path of a rotation center of the pinion gear when the pinion gear orbits about the sector gear.

3. The seat adjusting apparatus for the vehicle according to claim 1, wherein the contact portion comes in contact with the pinion gear at an opposite side, with respect to a center of the second bearing, to a side at which the engagement portion and the first bearing are positioned.

4. The seat adjusting apparatus for the vehicle according to claim 1, wherein the restriction mechanism restricts the relative rotation between the pinion gear and the sector gear in a direction in which the relative rotation is caused by the load applied to the supporting member.

5. The seat adjusting apparatus for the vehicle according to claim 1, wherein the contact portion includes a protrusion coming in contact with a radially outer end of a tooth of the pinion gear under a condition that the pinion gear engages with the engagement portion of the sector gear, the tooth of the pinion gear being disengaged from the engagement portion of the sector gear.

6. The seat adjusting apparatus for the vehicle according to claim 1, wherein
    the base member refers to a link member, one end portion of the link member being pivotally supported by an upper rail of a seat track adapted to be mounted on the vehicle floor for adjusting, in a front-rear direction of the vehicle, a seat cushion on which an occupant is seated, and the other end portion of the link member being pivotally supported by a lower arm constituting the seat cushion,
    the supporting member refers to the lower arm, and
    the pinion gear is rotatably supported by the second bearing formed on the lower arm.

7. The seat adjusting apparatus for the vehicle according to claim 6, wherein
    the link member is provided with a pivot hole formed on a first end portion of the link member and a securing hole formed on a second end portion of the link member for supporting the first bearing, and
    the link member includes a first link portion formed into a long shape and is pivotally connected to an attachment hole of the upper rail by means of a pivot shaft so as to be positioned outside of the upper rail, and the sector gear integrally formed at the first link portion.

8. The seat adjusting apparatus for the vehicle according to claim 7, wherein a no-teeth portion for restricting an engagement with the pinion gear is formed at the sector gear to be positioned next to a tooth and to be positioned away from a center line, the center line connecting a center of the pivot hole formed on the first link portion and a center of the securing hole formed on the first link portion, the tooth included in the teeth of the sector gear and being positioned farthest away from the center line.

* * * * *